United States Patent
Schillinger et al.

(10) Patent No.: US 11,614,125 B2
(45) Date of Patent: *Mar. 28, 2023

(54) ASSEMBLY FOR CONNECTING AN ADAPTER SHAFT TO A SHAFT IN A FORCE-FITTING MANNER USING A CLAMPING RING

(71) Applicant: SEW-EURODRIVE GMBH & CO. KG, Bruchsal (DE)

(72) Inventors: Jens Schillinger, Rastatt (DE); Sascha Haller, Karlsruhe (DE); Markus Wöppermann, Karlsbad (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,574

(22) Filed: Mar. 14, 2022

(65) Prior Publication Data

US 2022/0196077 A1 Jun. 23, 2022

Related U.S. Application Data

(63) Continuation of application No. 16/645,786, filed as application No. PCT/EP2018/025218 on Aug. 21, 2018, now Pat. No. 11,274,706.

(30) Foreign Application Priority Data

Sep. 8, 2017 (DE) ..................... 10 2017 008 438.6

(51) Int. Cl.
*F16D 1/04* (2006.01)
*F16D 1/08* (2006.01)
*F16D 1/104* (2006.01)

(52) U.S. Cl.
CPC ............. *F16D 1/0847* (2013.01); *F16D 1/04* (2013.01); *F16D 1/104* (2013.01)

(58) Field of Classification Search
None
See application file for complete search history.

(56) References Cited

U.S. PATENT DOCUMENTS

| | | | |
|---|---|---|---|
| 2,092,985 | A | 9/1937 | Okner |
| 2,432,860 | A | 12/1947 | Clatfelter |
| 3,598,432 | A | 8/1971 | Walker |

(Continued)

FOREIGN PATENT DOCUMENTS

| | | | |
|---|---|---|---|
| CN | 203835994 U | | 9/2014 |
| CN | 105121881 A | | 12/2015 |

(Continued)

*Primary Examiner* — Daniel J Wiley
(74) *Attorney, Agent, or Firm* — Carter, Deluca & Farrell LLP

(57) ABSTRACT

In an assembly for connecting an adapter shaft to a shaft in a force-fitting manner using a clamping ring, the clamping ring is mounted on the adapter shaft, the shaft is inserted into the adapter shaft, the clamping ring has a first radially uninterrupted threaded bore into which a first screw part is screwed, in particular a first threaded pin, which exerts pressure on the adapter shaft, the clamping ring has a second radially uninterrupted threaded bore into which a second screw part is screwed, in particular a second threaded pin, and the second screw part projects at least partially into a recess of the adapter shaft and in particular exerts pressure on the adapter shaft.

20 Claims, 5 Drawing Sheets

(56) References Cited

U.S. PATENT DOCUMENTS

| | | | |
|---|---|---|---|
| 3,879,046 | A | 4/1975 | Alford |
| 4,074,923 | A | 2/1978 | Howe, Jr. |
| 4,896,892 | A | 1/1990 | Andrews |
| 4,958,966 | A | 9/1990 | Andrews |
| 5,601,295 | A | 2/1997 | Baker |
| 8,944,718 | B2 | 2/2015 | Smith |
| 9,945,426 | B2 | 4/2018 | Kasper |
| 2007/0098314 | A1 | 5/2007 | Lenick et al. |
| 2015/0300414 | A1 | 10/2015 | Kasper |

FOREIGN PATENT DOCUMENTS

| | | | |
|---|---|---|---|
| DE | 102004011361 | B3 | 7/2005 |
| DE | 102011013887 | A1 | 9/2012 |
| DE | 102014007063 | A1 | 11/2014 |

ASSEMBLY FOR CONNECTING AN ADAPTER SHAFT TO A SHAFT IN A FORCE-FITTING MANNER USING A CLAMPING RING

CROSS-REFERENCE TO RELATED APPLICATIONS

The present application is a continuation of U.S. patent application Ser. No. 16/645,786, which is the national stage of PCT/EP2018/025218, having an international filing date of Aug. 21, 2018, and claims priority to Application No. 102017008438.6, filed in the Federal Republic of Germany on Sep. 8, 2017, each of which is expressly incorporated herein in its entirety by reference thereto.

FIELD OF THE INVENTION

The present invention relates to an assembly for connecting an adapter shaft to a shaft in a force-fitting manner using a clamping ring.

BACKGROUND INFORMATION

A shaft-hub connection is described in German Published Patent Application No. 10 2014 007 063 where an adapter shaft is connected to a shaft with the aid of a clamping ring.

Canadian Patent Document No. 203 835 994 describes another shaft-hub connection.

U.S. Patent Application Publication No. 2015/0300414 describes a planetary gear having a transport lock for an input adapter shaft of a planetary gear.

SUMMARY

Example embodiments of the present invention provide a force-fitting connection between a shaft and an adapter shaft.

According to an example embodiment of the present invention, in an assembly for connecting an adapter shaft to a shaft in a force-fitting manner using a clamping ring, the clamping ring is mounted on the adapter shaft, the shaft is inserted into the adapter shaft, the clamping ring has a first radially uninterrupted threaded bore into which a first screw part is screwed, in particular a first threaded pin, which exerts pressure on the adapter shaft, the clamping ring has a second radially uninterrupted threaded bore into which a second screw part is screwed, in particular a second threaded pin, and the second screw part at least partially projects into a recess of the adapter shaft and in particular exerts pressure on the adapter shaft.

This has the advantage that a loss protection is formed with the aid of the second threaded pin because it projects into a recess. The shrink-fitting connection, i.e. the force-fitting connection, is brought about with the aid of the first threaded pin. As a result, high contact pressure is induced by the first threaded pin on the one hand and a loss protection is brought about by the second threaded pin.

According to example embodiments, the recess is arranged as a blind bore, in particular as a radially directed blind bore introduced from radially outside, and thus particularly is not arranged to radially extend through the wall of the adapter shaft. This has the advantage of allowing for an uncomplicated production of the recess.

According to example embodiments, the particular surface region of the adapter shaft on which the first threaded pin exerts pressure is situated diametrically opposite the recess, in particular in the circumferential direction on the adapter shaft, in particular, the region axially covered by the surface region overlaps with the region axially covered by the recess or encompasses it. This has the advantage that given suitable dimensions of the flattened region and the recess, the adapter shaft is balanced, that is to say, does not require any additional balancing measures. The moment of inertia of the material removed to produce the recess thus, for example, corresponds to the moment of inertia of the material removed to produce the recess.

According to example embodiments, the particular surface region of the adapter shaft onto which the first threaded pin exerts pressure is arranged as a flattened region, in particular a flattened region that is tangentially aligned with respect to the axis of rotation of the adapter shaft. This offers the advantage of allowing for an uncomplicated production by surface-grinding, i.e. face-grinding.

According to example embodiments, the adapter shaft has axial slots, which are set apart from one another at regular intervals in the circumferential direction and/or the axial slots are radially uninterrupted and/or terminate at a first axial end of the adapter shaft, in particular into the environment. This has the advantage that high elasticity is able to be achieved in an uncomplicated manner.

According to example embodiments, the shaft is inserted into a region of the adapter shaft that is arranged as a hollow shaft region, in particular is situated coaxially with the adapter shaft. This has the advantage of allowing for an uncomplicated production.

According to example embodiments, the axial slots have an open configuration in the direction of the axial end of the adapter shaft, and thus particularly lead into the environment, in particular into the ambient air. This is considered advantageous insofar as it is easy to achieve high elasticity of the adapter shaft.

According to example embodiments, the region covered by the recess in the circumferential direction encompasses the region covered by a first one of the axial slots in the circumferential direction, and/or the region covered by the recess in the axial direction is encompassed by the region covered by the axial slot in the axial direction. This has the advantage that the axial slot extends through the recess. As a result, little material has to be removed when the recess is produced.

According to example embodiments, the first threaded pin has a diameter that is at least three times larger than the second threaded pin, and/or the first threaded bore has a diameter that is at least three times larger than the second threaded bore. This offers the advantage that the first threaded pin substantially brings about the force-fitting connection and the second threaded pin provides the loss protection.

According to example embodiments, the adapter shaft has a chamfer, in particular a lead-in bevel, in its axial end region. This has the advantage that the clamping ring is easy to slip on because the chamfer is situated on the radially outer surface, and thus makes the mounting of the clamping ring easier in that the wall thickness of the wall of the adapter shaft, i.e. the wall thickness of the hollow region of the adapter shaft, increases in the axial direction, so that the clamping ring is situated on a wall region that increases in thickness in the course of the mounting.

According to example embodiments, the clamping ring has a lead-in bevel in its axial end region. This has the advantage of allowing for a smooth mounting, the slotted region of the adapter shaft being increasingly shrink-fitted onto the solid shaft.

In this context, shrink-fitting does not refer to thermally induced contracting but to mechanically induced contracting.

Further features and aspects of example embodiments of the present invention are described in more detail below with reference to the appended Figures.

BRIEF DESCRIPTION OF THE DRAWINGS

FIG. 1 is a longitudinal cross-sectional view through a clamping unit, i.e. a clamping assembly, which has an adapter shaft 1 including a mounted clamping ring 4 and a first threaded pin 2 as well as a second threaded pin 3 for preventing the loss of clamping ring 4.

FIG. 2 is a perspective view of adapter shaft 1 from a first viewing direction, adapter shaft 1 being provided with a flattened region as a contact surface for first threaded pin 2.

FIG. 3 is a perspective view of adapter shaft 1 from a different viewing direction, and a bore 30 arranged as a blind bore for accommodating second threaded pin 3 being shown.

FIG. 4 is an exploded view of the clamping unit.

FIG. 5 is a partial cross-sectional view of the clamping unit.

DETAILED DESCRIPTION

Figure 1:
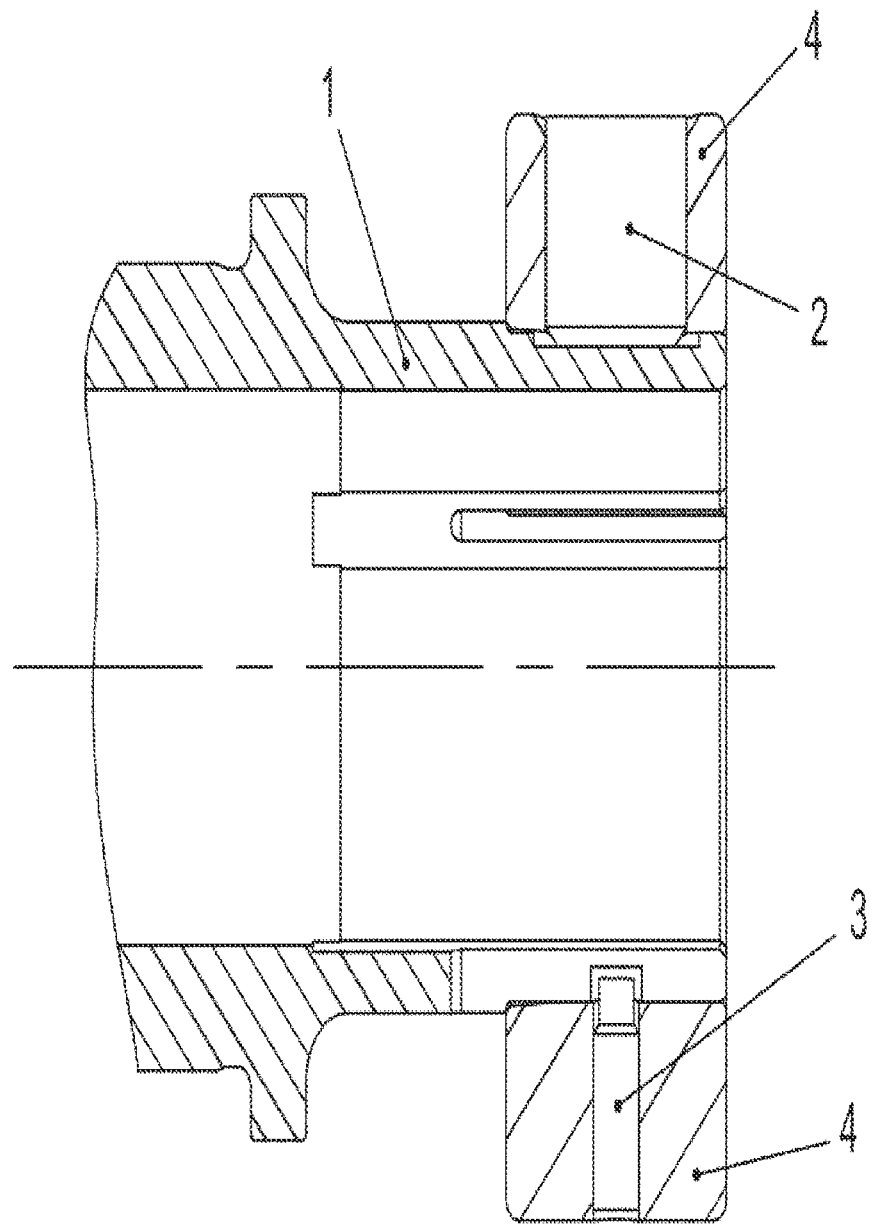
FIGS. 1 through 5 illustrate a first exemplary embodiment.
Figure 2:
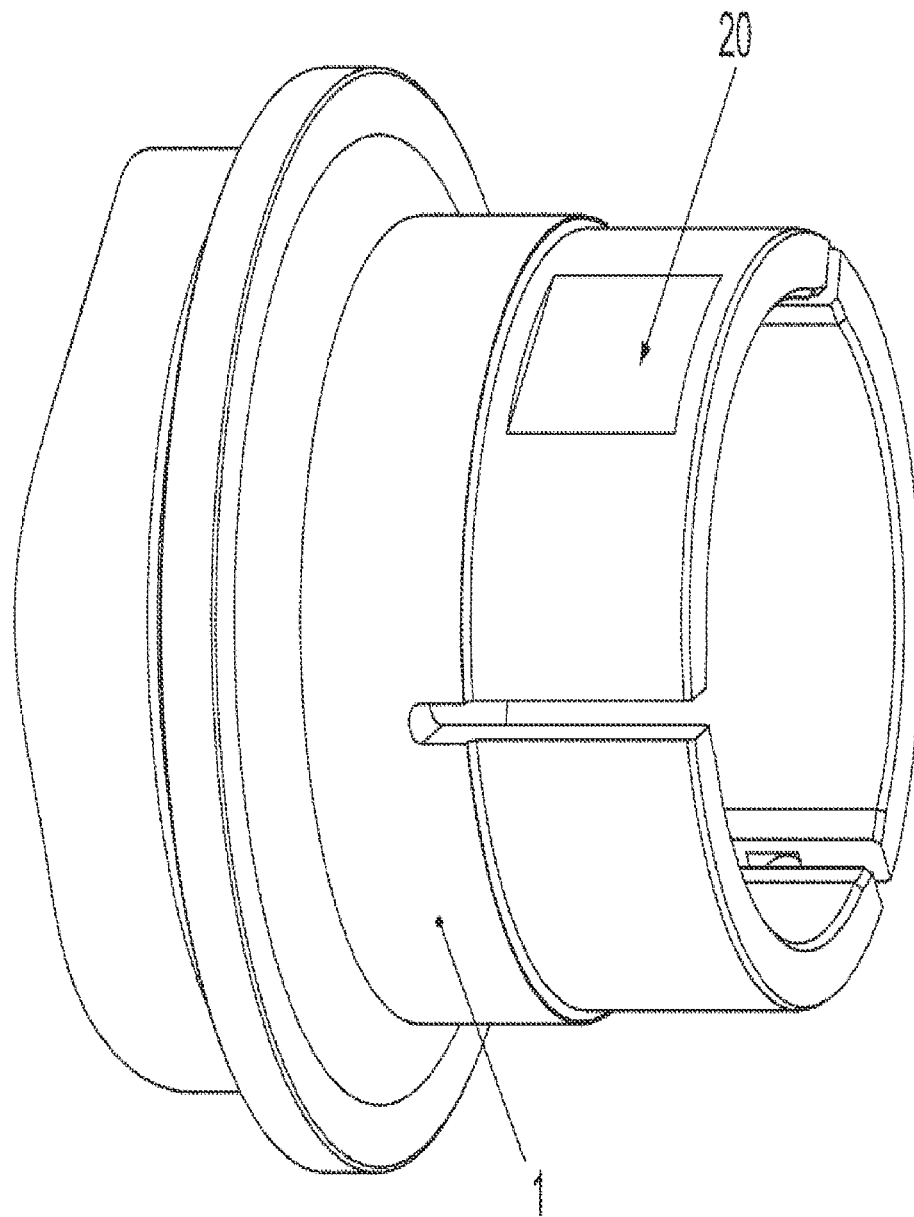
Figure 3:
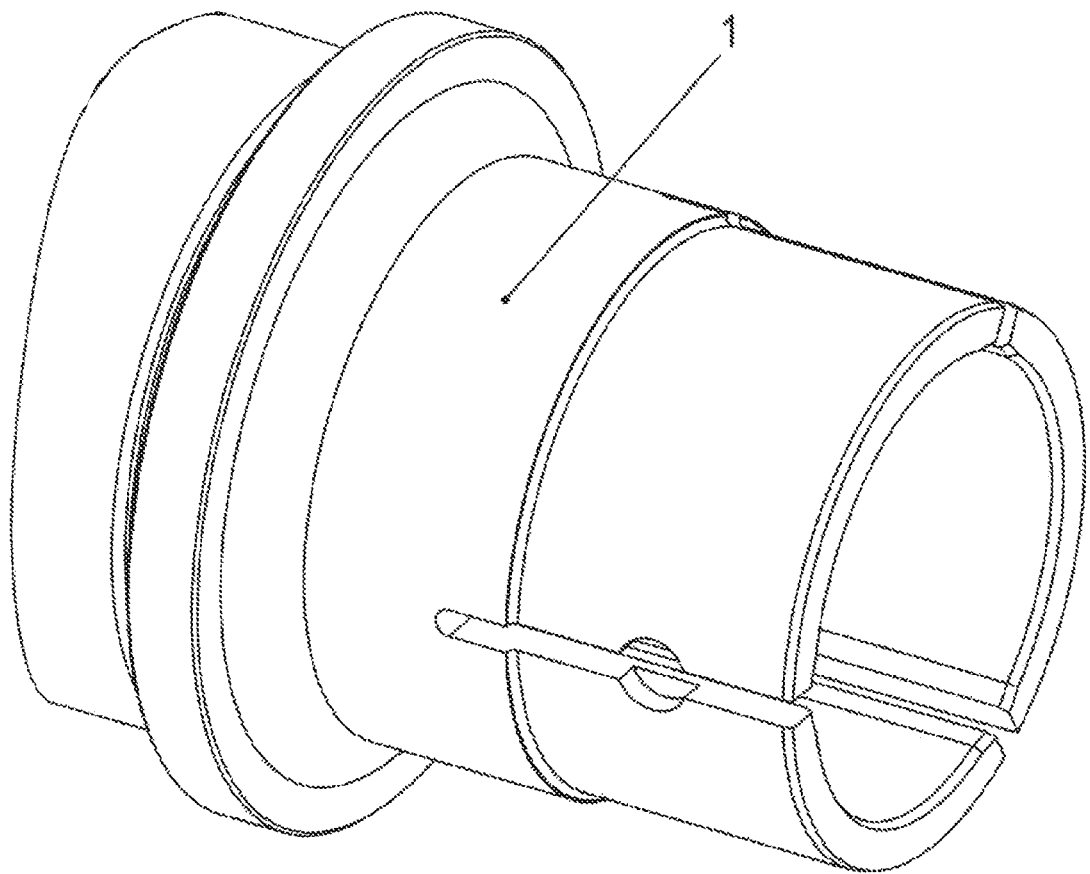
Figure 4:
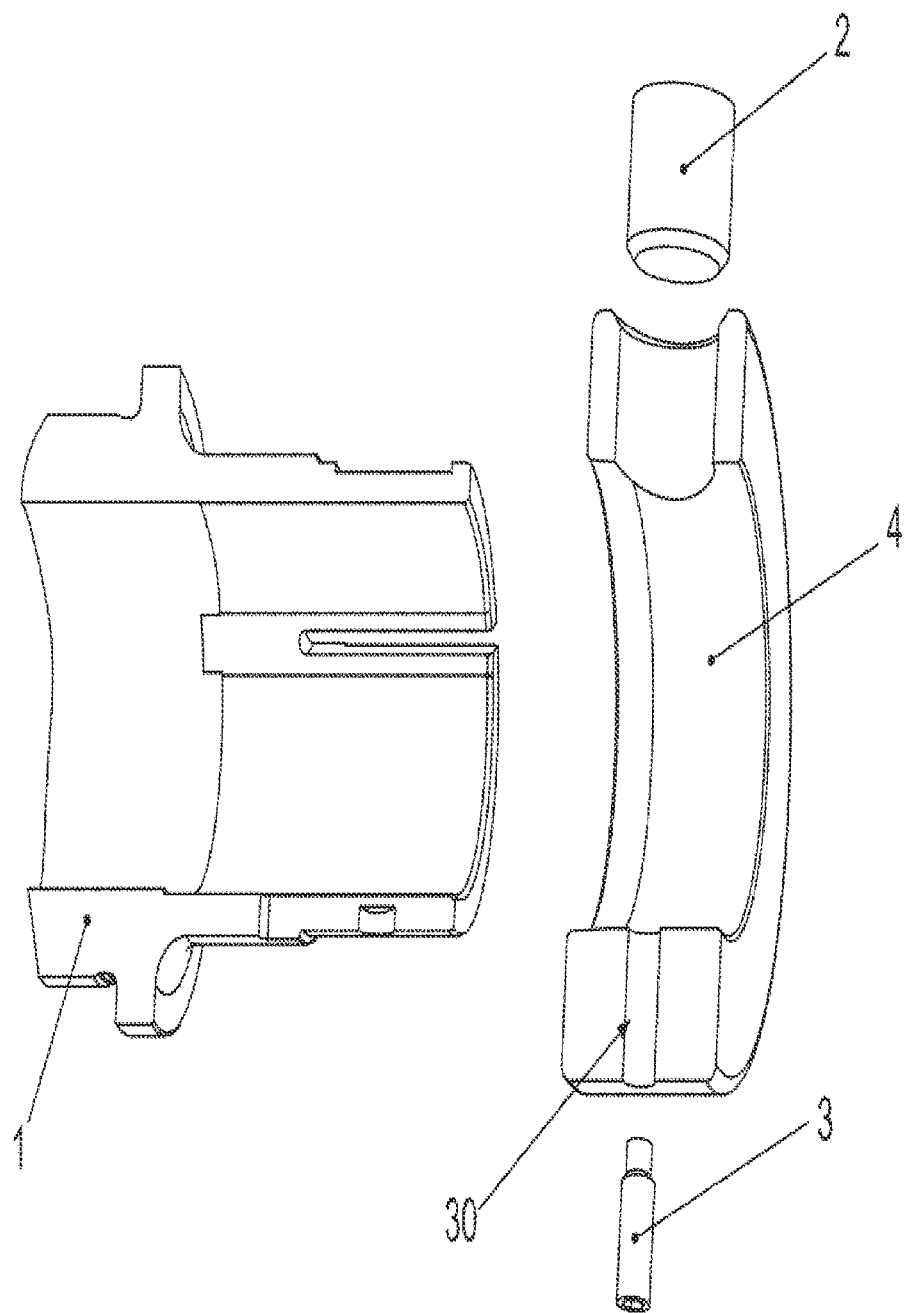
Figure 5:
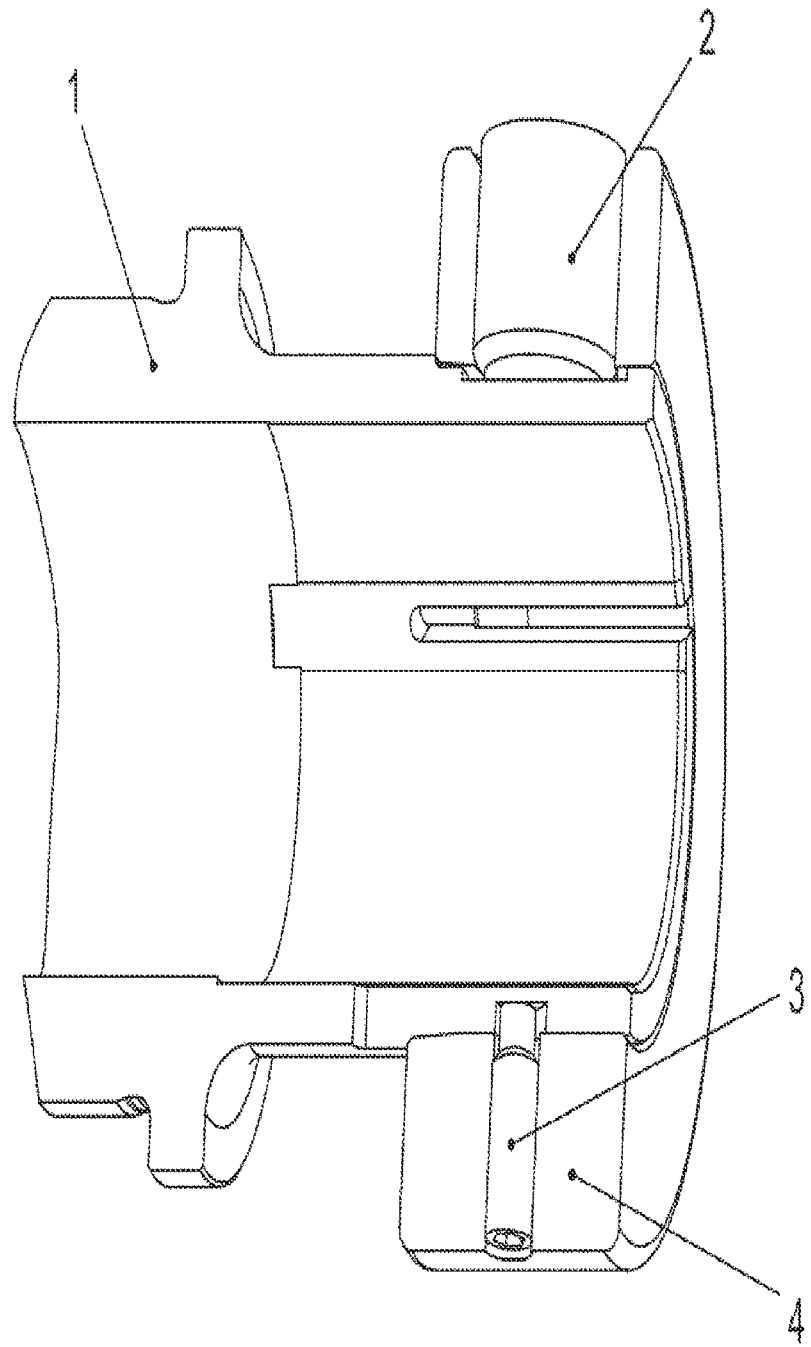

As illustrated in FIGS. 1 through 5, adapter shaft 1 has a hollow shaft region provided with axially extending slots, i.e. axial slots. The axial slots are, for example, set apart from one another at regular intervals in the circumferential direction and extend from the axially outer first end region of adapter shaft 1 to an axial position that is situated outside the axial region covered by clamping ring 4. The number of slots is, for example, three.

A solid shaft is introduced into adapter shaft 1. This solid shaft is thus radially surrounded by adapter shaft 1.

A first threaded pin 2 is screwed into a threaded bore that radially extends through clamping ring 4 and exerts pressure on a flattened region 20 situated on adapter shaft 1. As a result, adapter shaft 1 has no uninterrupted recess for first threaded pin 2.

Flattened region 20 is arranged developed on the outer side of adapter shaft 1 and tangentially aligned with respect to adapter shaft 1, i.e. in particular aligned perpendicular to a radial direction that is aligned parallel to the normal direction of flattened region 20.

Threaded pin 2 exerts pressure on flattened region 20. In the axial region covered by flattened region 20, adapter shaft 1 has a cylindrical configuration at its outer circumference, with the exception of the axial slots.

As a result, adapter shaft 1 is able to be pressed against the solid shaft by screwing first threaded pin 2 into the threaded bore that extends through the clamping ring so that a shrink-fitting connection, in particular, is obtained.

A second threaded bore, which radially extends through clamping ring 4, is, for example, provided diametrically opposite from the first threaded bore that passes through clamping ring 4.

A bore 30 is introduced into the adapter shaft diametrically opposite from flattened region 20 of adapter shaft 1 and used for pressing on second threaded pin 3, whose threaded region is screwed into the second radially uninterrupted threaded bore situated in the clamping ring.

Although bore 30 is arranged as a blind bore, it overlaps with an axial slot. As a result, second threaded pin 3 is able to be screwed into the second threaded bore which is arranged to pass radially through clamping ring 4, and then exerts pressure on the base of bore 30. In this manner, a loss protection is produced in the axial and in the circumferential direction. The axial slot, for example, passes through bore 30 in a centered manner. In this manner, flattened region 20, i.e. the particular region on which first threaded pin 2 exerts pressure, is situated diametrically opposite from bore 30. Since first threaded pin 2 generates a very high contact pressure, shrinking of adapter shaft 1 is thereby able to be induced without bore 30 being displaced. The second threaded pin applies only a low contact pressure on base area 30 of bore 30. Second threaded pin 3 has a much smaller diameter than first threaded pin 2. In the same manner, the diameter of the second threaded bore is much smaller, in particular at least three times smaller, than the diameter of the first threaded bore.

This secures adapter shaft 1 in the circumferential direction.

First threaded pin 2 thus has the function of exerting pressure on clamping ring 4 and to thereby induce the clamping of the shaft.

A lead-in bevel is, for example, provided on adapter shaft 1, which provides for a smooth mounting of adapter shaft 1 on clamping ring 4. During this mounting of clamping ring 4 on adapter shaft 1, adapter shaft 1 is elastically deformed, in particular radially compressed, and radially shrink-fitted onto the shaft accommodated in adapter shaft 1. Because of the axial slots, this elastic deformation is able to be induced using little force.

After the intended position of clamping ring 4 has been reached, adapter shaft 1 relaxes again so that the shaft is able to be introduced without any particular great force. The force-fitting connection is then produced in that threaded pin 2 exerts pressure on flattened region 20 and threaded pin 3 assumes the securing in the circumferential direction.

Adapter shaft 1, the two threaded pins (2, 3) as well as clamping ring 4 thus form a system for a force-fitting connection. The inner wall of clamping ring 4 is arranged like a region of a rotational solid, i.e. with a radial distance that is constant in every axial position, i.e. a radial distance that is independent of the circumferential position.

As a result, the arrangement hereof allows for a clamping connection, in particular a shrink-disk connection, between an adapter shaft and a shaft, in particular a solid shaft, including an integrated loss protection.

LIST OF REFERENCE NUMERALS 1 adapter shaft, in particular hollow shaft region
2 threaded pin
3 second threaded pin
4 clamping ring
20 flattened region
30 threaded bore

What is claimed is:
1. An assembly for connecting an adapter shaft to a shaft in a force-fitting manner, comprising:
a clamping ring adapted to be mounted on the adapter shaft, the shaft being insertable into the adapter shaft, the clamping ring having exactly two radially uninterrupted threaded bores arranged diametrically opposite to each other;

a first screw part screwed into a first one of the uninterrupted threaded bores and adapted to exert pressure on the adapter shaft; and a second screw part screwed into a second one of the radially uninterrupted threaded bores, at least partially projecting into a recess of the adapter shaft, and adapted to exert pressure on the adapter shaft;

wherein a surface region of the adapter shaft onto which the first screw part is adapted to exert pressure is arranged as a flattened region.

2. The assembly according to claim 1, wherein the adapter shaft includes axial slots set apart from one another at regular intervals in a circumferential direction, and a region covered by the recess in a circumferential direction encompasses a region covered by a first one of the axial slots in the circumferential direction.

3. The assembly according to claim 2, wherein the are radially uninterrupted and/or terminate at a first axial end of the adapter shaft, the axial slots having an open configuration in a direction of the axial end of the adapter shaft, and leading into the environment and/or ambient air.

4. The assembly according to claim 2, wherein the axial slots are radially uninterrupted and/or terminate at a first axial end of the adapter shaft into the environment.

5. The assembly according to claim 2, wherein the axial slots have an open configuration in a direction of an axial end of the adapter shaft and lead into the environment and/or ambient air.

6. The assembly according to claim 2, wherein a region covered by the recess in an axial direction is encompassed by a region covered by the axial slot in the axial direction.

7. The assembly according to claim 1, wherein at least one of the screw parts includes a threaded pin.

8. The assembly according to claim 1, wherein the recess is arranged as a blind bore, as a radially directed blind bore introduced from radially outside, and/or to not radially extend through a wall of the adapter shaft.

9. The assembly according to claim 1, wherein the surface region of the adapter shaft on which the first screw part is adapted to exert pressure is located diametrically opposite the recess, in a circumferential direction on the adapter shaft.

10. The assembly according to claim 9, wherein a region axially covered by the surface region overlaps and/or encompasses a region axially covered by the recess.

11. The assembly according to claim 1, wherein the flattened region is tangentially aligned with respect to the adapter shaft.

12. The assembly according to claim 1, wherein the flattened region is aligned perpendicular to a radial direction that is aligned parallel to a normal direction of the flattened region.

13. The assembly according to claim 1, wherein the shaft is insertable into a region of the adapter shaft that is arranged as a hollow shaft region and/or is arranged coaxially with the adapter shaft.

14. The assembly according to claim 1, wherein a diameter of the first screw part is at least three times larger than a diameter of the second screw part and/or a diameter of the first threaded bore is at least three times larger than a diameter of the second threaded bore.

15. The assembly according to claim 1, wherein the adapter shaft includes a chamfer and/or a lead-in bevel in an axial end region.

16. The assembly according to claim 1, wherein the clamping ring includes a lead-in bevel in an axial end region.

17. The assembly according to claim 1, wherein the flattened region is aligned perpendicular to a radial direction.

18. The assembly according to claim 1, wherein a normal to the flattened region extends in a radial direction.

19. A device, comprising:
an adapter shaft;
a shaft inserted into the adapter shaft; and
an assembly adapted to connect the adapter shaft to the shaft in a force-fitting manner, the assembly including:
a clamping ring adapted to be mounted on the adapter shaft, the shaft being insertable into the adapter shaft, the clamping ring having exactly two radially uninterrupted threaded bores arranged diametrically opposite to each other;
a first screw part screwed into a first one of the uninterrupted threaded bores and adapted to exert pressure on the adapter shaft; and
a second screw part screwed into a second one of the radially uninterrupted threaded bores, at least partially projecting into a recess of the adapter shaft, and adapted to exert pressure on the adapter shaft;
wherein a surface region of the adapter shaft onto which the first screw part is adapted to exert pressure is arranged as a flattened region.

20. The device according to claim 19, wherein the adapter shaft includes axial slots set apart from one another at regular intervals in a circumferential direction, and a region covered by the recess in a circumferential direction encompasses a region covered by a first one of the axial slots in the circumferential direction.

* * * * *